US012028692B2

(12) United States Patent
Olsen et al.

(10) Patent No.: US 12,028,692 B2
(45) Date of Patent: Jul. 2, 2024

(54) LOUDSPEAKER ARRANGEMENT

(71) Applicant: Harman Becker Automotive Systems GmbH, Karlsbad (DE)

(72) Inventors: Martin Olsen, Karlsbad (DE); Lars Goller, Herning (DK)

(73) Assignee: Harman Becker Automotive Systems GmbH, Karlsbad (DE)

( * ) Notice: Subject to any disclaimer, the term of this patent is extended or adjusted under 35 U.S.C. 154(b) by 107 days.

(21) Appl. No.: 17/766,590

(22) PCT Filed: Oct. 30, 2019

(86) PCT No.: PCT/EP2019/079578

§ 371 (c)(1),
(2) Date: Apr. 5, 2022

(87) PCT Pub. No.: WO2021/083499

PCT Pub. Date: May 6, 2021

(65) Prior Publication Data

US 2023/0345177 A1 Oct. 26, 2023

(51) Int. Cl.

| | |
|---|---|
| ***H04R 5/00*** | (2006.01) |
| ***H04R 1/26*** | (2006.01) |
| ***H04R 5/02*** | (2006.01) |
| *H04R 1/32* | (2006.01) |

(52) U.S. Cl.

CPC ................. *H04R 5/02* (2013.01); *H04R 1/26* (2013.01); *H04R 1/323* (2013.01); *H04R 2499/13* (2013.01)

(58) Field of Classification Search

CPC .............................. H04R 2499/13; H04R 1/26
See application file for complete search history.

(56) References Cited

U.S. PATENT DOCUMENTS

| | | | |
|---|---|---|---|
| 5,966,453 A | 10/1999 | Koyano et al. | |
| 2003/0142844 A1 | 7/2003 | Rivera | |
| 2009/0262963 A1 * | 10/2009 | Inoue ...................... | H04R 5/02 381/302 |
| 2013/0182883 A1 | 7/2013 | Takeda et al. | |
| 2019/0069090 A1 | 2/2019 | Carpentier | |

FOREIGN PATENT DOCUMENTS

| | | |
|---|---|---|
| EP | 1558060 A2 | 7/2005 |
| JP | 2003054326 A | 2/2003 |
| WO | 2012172394 A1 | 12/2012 |
| WO | 2021083499 A1 | 5/2021 |

OTHER PUBLICATIONS

International Search Report dated May 27, 2020 for PCT Appn. No. PCT/EP2019/079578 filed Oct. 30, 2019, 16 pgs.

* cited by examiner

*Primary Examiner* — Ping Lee
(74) *Attorney, Agent, or Firm* — Brooks Kushman P.C.

(57) ABSTRACT

A loudspeaker arrangement comprises a mid-range loudspeaker arranged in a dashboard of a vehicle, a first tweeter arranged adjacent to the mid-range loudspeaker in the dashboard of the vehicle, and a second tweeter arranged adjacent to the mid-range loudspeaker in the dashboard of the vehicle. The mid-range loudspeaker is arranged between the first tweeter and the second tweeter. The mid-range loudspeaker is a non-directional loudspeaker that radiates sound towards a driver's seat and towards a passenger seat in equal parts. The first tweeter is a directional loudspeaker that radiates sound primarily towards the passenger seat, and the second tweeter is a directional loudspeaker that radiates sound primarily towards the driver's seat.

10 Claims, 3 Drawing Sheets

LOUDSPEAKER ARRANGEMENT

CROSS-REFERENCE TO RELATED APPLICATION

This application is the U.S. national phase of PCT Application No. PCT/EP2019/079578 filed on Oct. 30, 2019 the disclosure of which is hereby incorporated in its entirety by reference herein.

TECHNICAL FIELD

The disclosure relates to a loudspeaker arrangement, especially a loudspeaker arrangement or loudspeaker layout in a vehicle.

BACKGROUND

Vehicles today have sound systems including a plurality of loudspeakers, wherein the different loudspeakers usually collectively cover the complete audible frequency range if appropriate sound system tuning is applied. The loudspeakers are arranged at different positions within the vehicle. The positioning of the individual loudspeakers (the different types of loudspeakers such as, for example, woofers, mid-range loudspeakers and tweeters) is generally carried out depending on the physics of the sound radiated in the listening space (e.g., vehicle cabin) as well as on the human perception of sound. The aim of the loudspeaker arrangements generally is to provide a satisfactory listening experience not only for the driver of the vehicle, but also for any further passengers of the vehicle.

SUMMARY

A loudspeaker arrangement includes a mid-range loudspeaker arranged in a dashboard of a vehicle, a first tweeter arranged adjacent to the mid-range loudspeaker in the dashboard of the vehicle, and a second tweeter arranged adjacent to the mid-range loudspeaker in the dashboard of the vehicle. The mid-range loudspeaker is arranged between the first tweeter and the second tweeter. The mid-range loudspeaker is a non-directional loudspeaker that radiates sound towards a driver's seat and towards a passenger seat in equal parts. The first tweeter is a directional loudspeaker that radiates sound primarily towards the passenger seat, and the second tweeter is a directional loudspeaker that radiates sound primarily towards the driver's seat.

Other systems, methods, features and advantages will be or will become apparent to one with skill in the art upon examination of the following detailed description and figures. It is intended that all such additional systems, methods, features and advantages be included within this description, be within the scope of the invention and be protected by the following claims.

BRIEF DESCRIPTION OF DRAWINGS

The arrangement may be better understood with reference to the following description and drawings. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
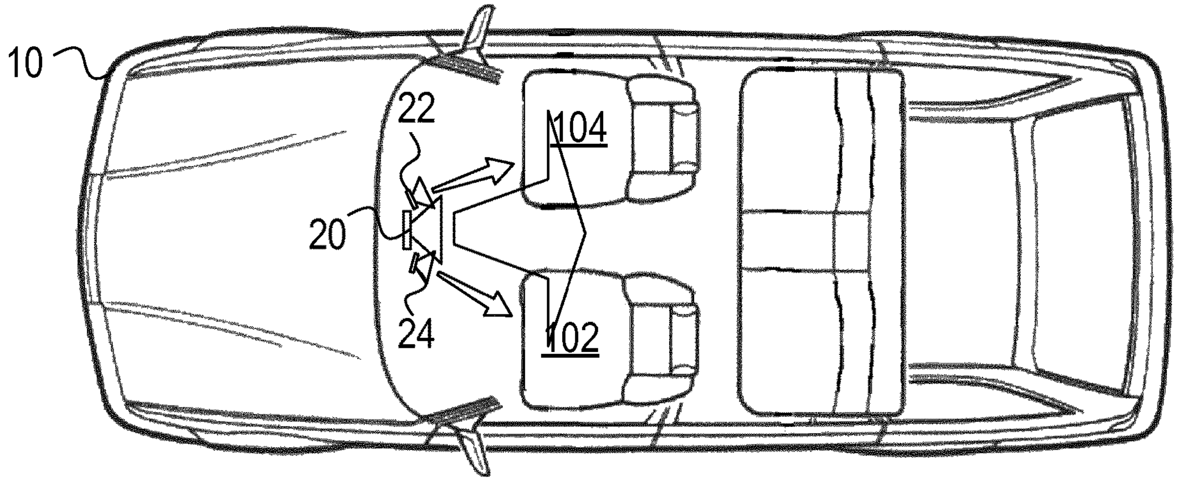
FIG. 1 schematically illustrates an exemplary loudspeaker arrangement.

Referring to FIG. 1, a loudspeaker arrangement in a vehicle 10 is schematically illustrated. The Figure shows a top view of a vehicle 10. The vehicle 10 comprises a driver's seat 102 and a passenger seat 104. A loudspeaker arrangement is arranged in the dashboard of the vehicle 10. That is, when the loudspeaker arrangement radiates sound, a general direction of the sound is from the front of the vehicle 10 towards the back of the vehicle 10. However, the loudspeaker arrangement as illustrated in claim 1 is configured to primarily reproduce sound to be perceived by the driver and another passenger seated in the front seat next to the driver, not by passengers seated on the back seats.

The loudspeaker arrangement comprises a mid-range loudspeaker 20 that is configured to radiate sound at frequencies of, for example, between 250 to 2000 Hz. Some mid-range loudspeakers may even radiate sound at frequencies of between 250 to 3000 Hz, for example, depending on the capability of other loudspeakers such as, for example, tweeters, included in the same loudspeaker arrangement. Any other suitable frequency ranges are generally possible, depending on the specific application and system. The loudspeaker arrangement further comprises a first tweeter 22 (high-frequency loudspeaker) and a second tweeter 24 (high-frequency loudspeaker). Each of the first and second tweeter 22, 24 is configured to radiate sound at a frequency that is higher than the frequency radiated by the mid-range loudspeaker 20, for example, between 2 to 20 kHz. The tweeters 22, 24 may even radiate frequencies of above 20 kHz. Arrangements including tweeters that radiate frequencies of above 20 kHz are often referred to as high resolution audio systems. The mid-range loudspeaker 20 is arranged between the first tweeter 22 and the second tweeter 24. That is, the first tweeter 22 is arranged on a first side of the mid-range loudspeaker 20 (e.g., the right side as seen from the passenger compartment) and the second tweeter 24 is arranged on a second side of the mid-range loudspeaker 20 that is opposite to the first side (e.g., the left side as seen from the passenger compartment).

The mid-range loudspeaker 20 is a non-directional loudspeaker or a loudspeaker with a controlled dispersion. A controlled dispersion may be achieved in any suitable way, e.g., by using acoustical lenses, or by providing several mid-range or full-range loudspeakers in an array configuration (e.g., several mid-range or full-range loudspeakers arranged in a line array). Another possibility to control the directivity of sound energy emitted by a loudspeaker arrangement is to perform digital signal processing (DSP) by controlling filters, equalizers and delays. For example, digital signal processing may be realized by using finite impulse response (FIR) filters. That is, the mid-range loudspeaker 20 radiates sound over a wide area which is indicated by the wide arrow in FIG. 1. Therefore, the mid-range loudspeaker 20 radiates sound towards both the driver's seat 102 and the passenger seat 104 essentially in equal parts. The mid-range loudspeaker 20 may be regarded as radiating sound towards both the driver's seat 102 and the passenger seat 102 essentially in equal parts if a possibly non-symmetric geometry of the dashboard does not significantly affect the sound distribution. The mid-range loudspeaker 20 does not radiate sound in a specific preferred direction, but radiates sound essentially homogenously throughout the passenger compartment of the vehicle 10.

The first tweeter 22 and the second tweeter 24, on the other hand, are directional loudspeakers or loudspeaker assemblies or devices that create a directive loudspeaker (e.g., a plurality of dome tweeters or other electro-dynamic transducers together may form a directive loudspeaker). The first tweeter 22 and the second tweeter 24 may have an inherent directivity, for example, the first tweeter 22 and the second tweeter 24 each may be an electro-dynamic planar loudspeaker (EDPL). An inherent directivity (ability to focus the sound field radiated by the loudspeaker), for example, may be caused by a large physical extent of the vibrating loudspeaker membrane relative to the short wave length of the high frequency sound waves. The first tweeter 22 radiates sound primarily towards the passenger seat 104, while the second tweeter 24 radiates sound primarily towards the driver's seat 102. That is, a main radiation lobe of the first tweeter 22 is directed towards the passenger seat 104, and a main radiation lobe of the second tweeter 24 is directed towards the driver's seat 102, which is indicated with the slim arrows in FIG. 1.

Figure 6:
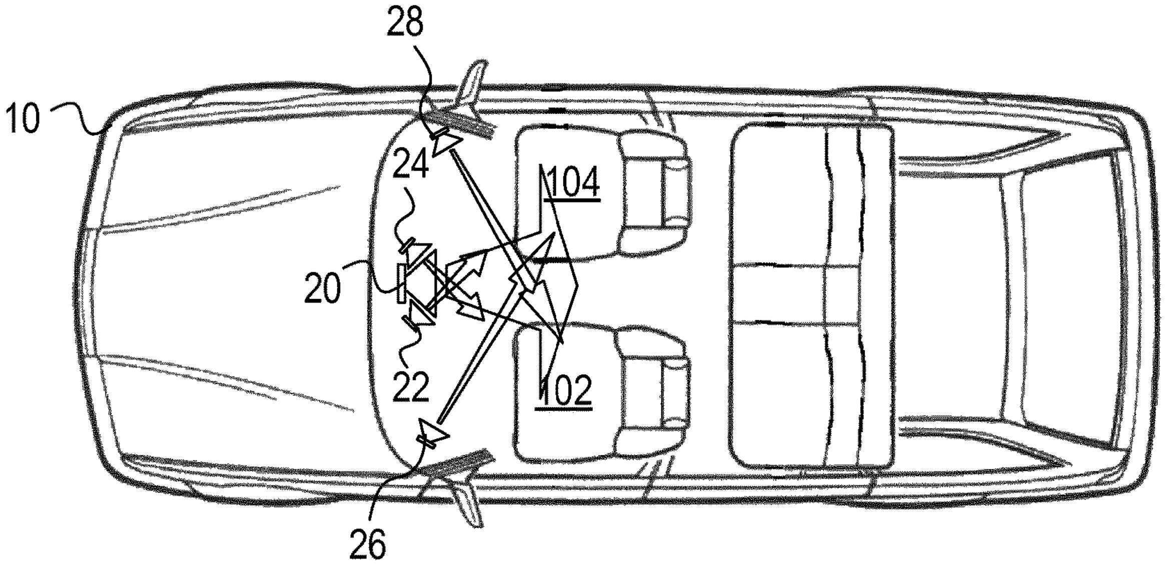
FIG. 6 schematically illustrates another exemplary loudspeaker arrangement.

The mid-range loudspeaker 20 is arranged centrally in or on the dashboard of the vehicle 10. That is, a distance between the mid-range loudspeaker 20 to the driver's seat 102 is essentially equal to a distance between the mid-range loudspeaker 20 and the passenger seat 104. In the example illustrated in FIG. 1, the first tweeter 22 which radiates sound primarily towards the passenger seat 104 is arranged closer to the passenger seat 104 than to the driver's seat 102, and the second tweeter 24 which radiates sound primarily towards the driver's seat 102 is arranged closer to the driver's seat 102 than to the passenger seat 104. That is, the main radiation lobes of the first and second tweeter 22, 24 do not intersect in the example of FIG. 1. However, even if the main radiation lobes of the first and second tweeter 22, 24 do not intersect, in real life application a certain leakage of sound energy will occur such that a certain interference occurs to some extent. This, however, is only an example. It is also possible that the first tweeter 22 which radiates sound primarily towards the passenger seat 104 is arranged closer to the driver's seat 102 than to the passenger seat 104 (e.g., on the left side of the mid-range loudspeaker 20 as seen from the passenger compartment), and that the second tweeter 24 which radiates sound primarily towards the driver's seat 102 is arranged closer to the passenger seat 104 than to the driver's seat 102 (e.g., on the right side of the mid-range loudspeaker 20 as seen from the passenger compartment). That is, it is also possible that the main radiation lobes of the first tweeter 22 and the second tweeter 24 intersect in front of the mid-range loudspeaker 20, as is exemplarily illustrated in FIG. 6.

The first tweeter 22 is arranged adjacent to the mid-range loudspeaker 20. Adjacent in this context entails that the first tweeter 22 is arranged at a distance d22 of no more than 10 cm, or at a distance d22 of no more than 5 cm from the mid-range loudspeaker 20. According to one example, the distance d22 is between about 110 mm and 160 mm, wherein the distance d22 refers to a distance between the center of the mid-range loudspeaker 20 and the center of the first tweeter 22. The second tweeter 24 is also arranged adjacent to the mid-range loudspeaker 20. That is, the second tweeter 24 is arranged at a distance d24 (distance between the center of the mid-range loudspeaker 20 and the center of the second tweeter 24) of no more than 10 cm, or at a distance d24 of no more than 5 cm from the mid-range loudspeaker 20. According to one example, the distance d24 is between about 110 mm and 160 mm. In this way, a compact center arrangement is provided in the front part of the passenger compartment. By providing the described center loudspeaker arrangement in a vehicle 10, the acoustic radiation within the vehicle 10 may be controlled, resulting in a reception of the sound (e.g., music, speech, or other audible signals) at the position of the listeners within the vehicle 10 that is disturbed less by reflections from the acoustical environment in the front part (dashboard area) of the vehicle 10. The sound signals reproduced by the loudspeaker arrangement when they reach the listener's positions are disturbed less by the surroundings (reflections from the acoustical environment in the front part (dashboard area) of the vehicle 10) as compared to conventional loudspeaker arrangements. The sound that is reproduced by the mid-range loudspeaker 20 is spread widely throughout the vehicle 10 and is reflected by a plurality of surfaces. First-order reflections caused by the side windows of the vehicle 10 may be reduced by using a mid-range loudspeaker 20 in combination with an acoustical lens assembly, or by implementing array processing if the mid-range loudspeaker 20 comprises a compact loudspeaker array, for example. Compact loudspeaker array refers to an arrangement of two or more loudspeakers that cover a common frequency range, collectively controlling the sound dispersions by means of passive or active control (e.g., processing via Finite Impulse Response (FIR) filtering or delay and sum). The sound reproduced by the first and second tweeters 22, 24, on the other hand, is focused directly towards the driver's seat 102 and the passenger seat 104, respectively. When the sound from the first and second tweeters 22, 24 reaches the respective position, therefore, is the sound is disturbed significantly less by any reflections. This increases the listening experience at least for the driver and a passenger seated in the passenger seat 104 of the vehicle 10.

The mid-range loudspeaker 20 may be any kind of non-directional loudspeaker. However, the radiated sound may be primarily radiated towards the driver's seat 102 and the passenger seat 104, that is, towards the front row passengers, not the back seat passengers. The first tweeter 22 and the second tweeter 24 on the other hand are directional loudspeakers or loudspeaker assemblies or devices that create a directive loudspeaker. According to one example, the first tweeter 22 and the second tweeter 24 each comprise at least one inherent beamforming loudspeaker such as, e.g., an electrodynamic planar loudspeaker. Sound radiation from the first and second tweeters 22, 24 may be controlled in order to focus the main radiation lobe to a desired position. Different techniques are known for generating directional sound. Generally, the directivity of the sound radiated from a loudspeaker relates to the size of the sound source as compared to the wavelengths of the radiated sound waves. The larger the sound source is compared to the wavelength of the radiated sound waves, the more directional is the resulting sound beam. While a large loudspeaker is naturally more directional because of its large size, a sound source with equivalent directivity may be utilized by providing an array of traditional small loudspeakers that are all driven together in-phase or in an active sense by employing digital signal processing. Another possibility, for example, is to provide acoustic lenses in front of a loudspeaker in order to focus the radiated sound to a desired position. According to another example, each of the first and second tweeters 22, 24 may comprise a so-called acoustical lens technology (ALT) loudspeaker. Such ALT loudspeakers comprise, for example, acoustic lenses to control the directivity of sound radiated by the loudspeaker. For example, an ALT loudspeaker may comprise a dome tweeter or mid-range loudspeaker in combination with an acoustic scatterer that is attached to (on top of or in front of) the dome tweeter or mid-range loudspeaker. Acoustic lenses may be used to redistribute acoustic energy with a very well defined distribution pattern with negligible distortion of the signal and independent of the frequency of the sound signal within the frequency range of interest.

Figure 2:
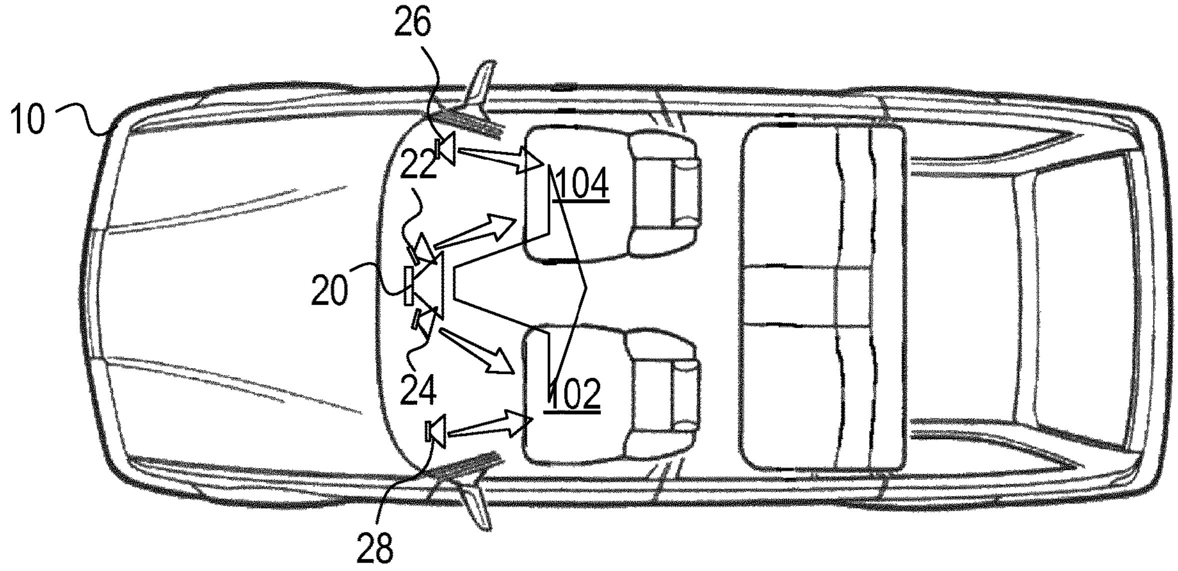
FIG. 2 schematically illustrates another exemplary loudspeaker arrangement.

Now referring to FIG. 2, the loudspeaker arrangement may further comprise a third tweeter 26 on the first side of the mid-range loudspeaker 20 (e.g., right side as seen from the passenger compartment), and a fourth tweeter 28 on the second side of the mid-range loudspeaker 20 (e.g., left side as seen from the passenger compartment). The third and the fourth tweeter 26, 28 each may be arranged distant to the mid-range loudspeaker 20. That is, the third tweeter 26 may be arranged on a first side of the mid-range loudspeaker 20 at a distance d26 of at least 50 cm (e.g., d26=64 cm) from the mid-range loudspeaker 20, and the fourth tweeter 28 may be arranged on the second side of the mid-range loudspeaker 20 at a distance d28 of at least 50 cm (e.g., d26=64 cm) from the mid-range loudspeaker 20. The distances d26, d28 again refer to a distance of the center of the mid-range loudspeaker 20 and the center of the third or fourth tweeter 26, 28. According to one example, the third tweeter 26 is arranged on the first side of the mid-range loudspeaker 20 close to the furthest edge of the dashboard, and the fourth tweeter 28 is arranged on the second side of the mid-range loudspeaker 20 close to the furthest edge of the dashboard, wherein the third tweeter 26 is arranged at the opposite end of the dashboard as the fourth tweeter 28. The third tweeter 26 may be a directional loudspeaker or loudspeaker assembly or device that creates a directive loudspeaker that radiates sound primarily towards the passenger seat 104, and the fourth tweeter 28 may be a directional loudspeaker or loudspeaker assembly or device that creates a directive loudspeaker that radiates sound primarily towards the driver's seat 102.

Figure 5:
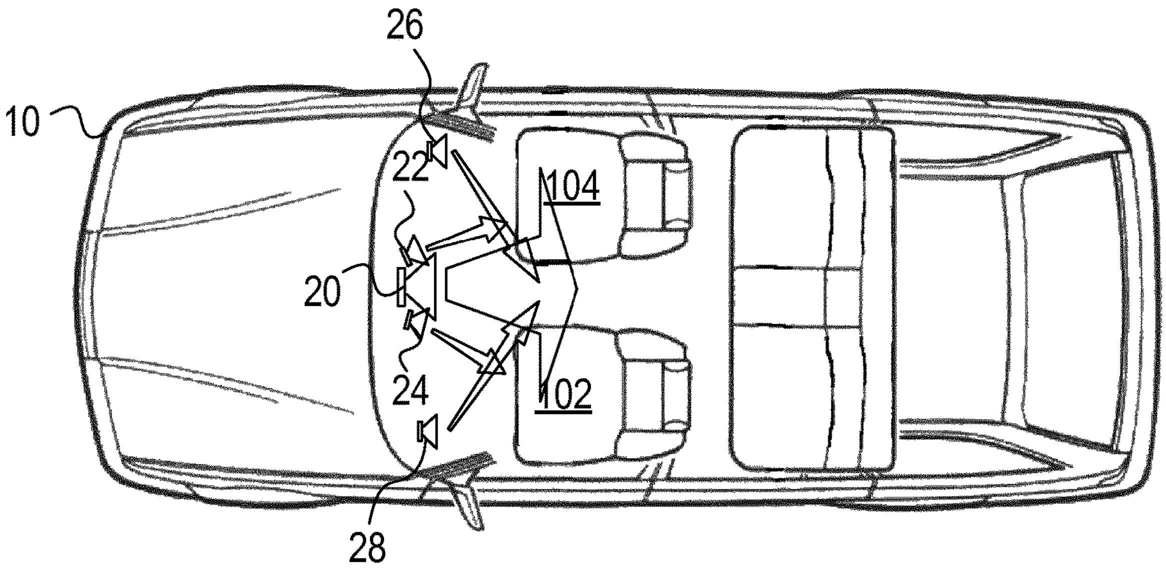
FIG. 5 schematically illustrates another exemplary loudspeaker arrangement.

In the example illustrated in FIG. 2, the third tweeter 26 which radiates sound primarily towards the passenger seat 104 is arranged closer to the passenger seat 104 than to the driver's seat 102, and the fourth tweeter 28 which radiates sound primarily towards the driver's seat 102 is arranged closer to the driver's seat 102 than to the passenger seat 104. That is, the main radiation lobes of the third and fourth tweeter 26, 28 do not intersect in the example of FIG. 2. This, however, is only an example. It is also possible that the third tweeter 26 which radiates sound primarily towards the passenger seat 104 is arranged closer to the driver's seat 102 than to the passenger seat 104 (e.g., on the left side of the mid-range loudspeaker 20 and the left end of the dashboard as seen from the passenger compartment), and that the fourth tweeter 28 which radiates sound primarily towards the driver's seat 102 is arranged closer to the passenger seat 104 than to the driver's seat 102 (e.g., on the right side of the mid-range loudspeaker 20 and the right end of the dashboard as seen from the passenger compartment). That is, it is also possible that the main radiation lobes of the third tweeter 26 and the fourth tweeter 28 intersect in front of the mid-range loudspeaker 20, as is exemplarily illustrated in FIG. 6. According to an even further example, it is also possible that the main radiation lobes of the third tweeter 26 and the fourth tweeter 28 radiate sound towards a position different from the driver's seat 102 and the passenger seat 104. This is exemplarily illustrated in the arrangement of FIG. 5. In this example, the main radiation lobes of the third tweeter 26 and the fourth tweeter 28 are both directed towards a position between the driver's seat 102 and the passenger seat 104, for example towards the gear knob, the center console, the center of the passenger compartment or any other position between the driver's seat 102 and the passenger seat 104. In this way, the sound stage width may be increased. The exact position to which the main radiation lobes of the third and fourth tweeters 26, 28 are directed may depend on the desired sound tuning strategy of the specific arrangement and may differ from case to case.

In the example illustrated in FIG. 2, the third tweeter 26 and the fourth tweeter 28 are mounted in or on the dashboard of the vehicle 10. This, however, is only an example. Generally, while the mid-range loudspeaker 20, the first tweeter 22 and the second tweeter 24 are arranged centrally in or on the dashboard, the third tweeter 26 may be arranged anywhere on the first side (or the second side as seen from the passenger compartment) of and distant to the mid-range loudspeaker 20, and the fourth tweeter 28 may be arranged anywhere on the second side (or the first side as seen from the passenger compartment) of and distant to the mid-range loudspeaker 20.

Figure 3:
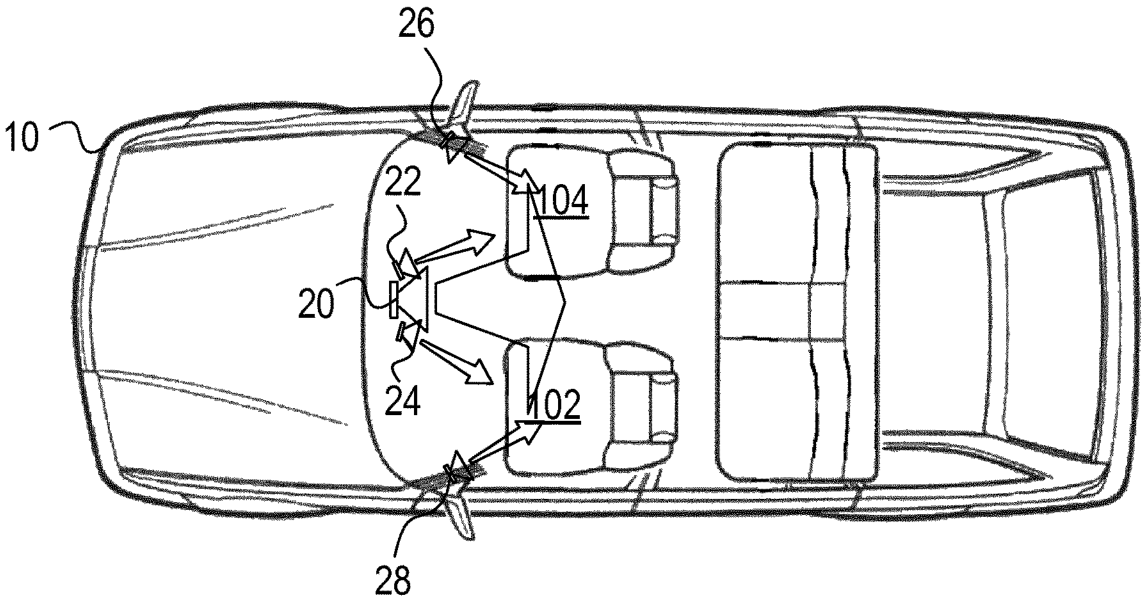
FIG. 3 schematically illustrates another exemplary loudspeaker arrangement.

Another exemplary loudspeaker arrangement is illustrated in FIG. 3. In this example, the third tweeter 26 and the fourth tweeter 28 are mounted to the A-pillar of the vehicle 10. With the exception of the exact mounting position, everything that has been discussed with respect to the third and fourth tweeter 26, 28 in the example of FIG. 2 above, also applies to the third and fourth tweeter 26, 28 of FIG. 3. Further, the center configuration of the mid-range loudspeaker 20, the first tweeter 22 and the second tweeter 24 corresponds to the center configurations as described with respect to FIGS. 1 and 2.

Figure 4:
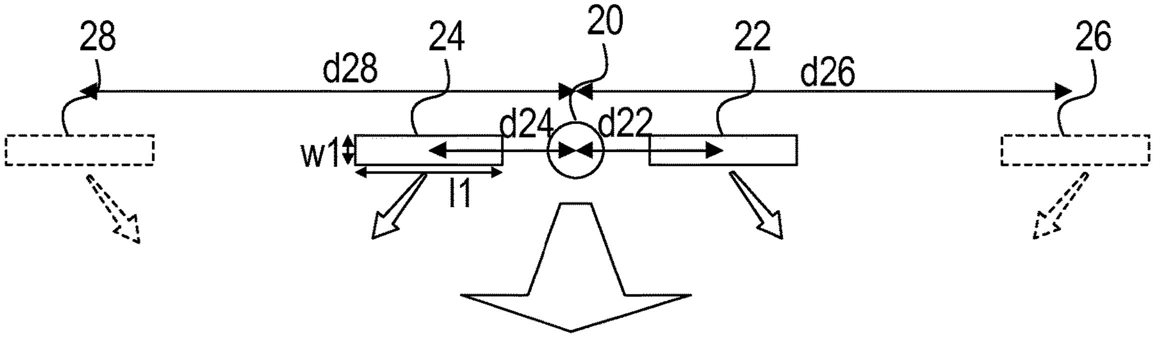
FIG. 4 schematically illustrates an exemplary loudspeaker arrangement in greater detail.

As has already been discussed above, the first and second tweeters 22, 24 as well as the optional third and fourth tweeters 26, 28 are directional loudspeakers or loudspeaker assemblies or devices that create a directive loudspeaker. That is, the main radiation lobe of the first, second, third, and fourth tweeters 22, 24, 26, 28 is focused either on the driver's seat 102 (second and fourth tweeters 24, 28 in the examples of FIGS. 1 to 3) or on the passenger seat 104 (first and third tweeter 22, 26 in the examples of FIGS. 1 to 3). As has also been discussed above, it is also possible that alternatively the main radiation lobes of the third tweeter 26 and the fourth tweeter 28 are focused on a position somewhere between the driver's seat 102 and the passenger seat 104. As has already been discussed above, the directivity of the sound radiated from a loudspeaker corresponds to the size of the source as compared to the wavelengths of the sound radiated by the respective loudspeaker. The larger the sound source is compared to the wavelength of the sound waves, the more directional is the resulting sound beam. Therefore, according to one example, the non-directional mid-range loudspeaker 20 has a circular cross-section, and the first tweeter 22 and the second tweeter 24 each have a rectangular cross-section. This is schematically illustrated in FIG. 4. The tweeters 22, 24 on the other hand may be extended sound sources that have a length 11 in a first direction which is significantly larger than a width w1 in a second direction, the second direction being perpendicular with respect to the first direction. This is exemplarily illustrated with respect to the second tweeter 24 in FIG. 4. In this way, the first and second tweeters 22, 24 have an inherent directivity. That is, the first and second tweeters 22, 24 output directional sound without having to implement any further beamforming capabilities. The first and second tweeters 22, 24 in the example of FIG. 4 are physically extended sound sources. Such extended sound sources generally provide a simple, non-directional sound radiation at frequencies below 2 kHz, and have an inherent directivity for frequencies of between 2 and 20 kHz. The same applies for the optional third and fourth tweeters 26, 28. However, as has been discussed above, alternatively the first tweeter 22 and the second tweeter may also be acoustical lens technology (ALT) loudspeakers, for example.

The mid-range loudspeaker 20, on the other hand, may not possess pronounced focused directional sound radiation characteristics. The inherent directivity of the mid-range loudspeaker 20 may be minimized, for example, by using a physically small loudspeaker (sound emission surface area comparably small).

According to one example, the first tweeter 22 is identical in construction to the second tweeter 24. The third tweeter 26 may also be identical in construction to the fourth tweeter 28. Even further, the first and second tweeters 22, 24 may be identical in construction to the third and fourth tweeters 26, 28. If acoustic lenses are used for creating directive sound, a potential asymmetry of the dashboard may be taken into account. For example, the acoustic lenses of the different tweeters 22, 24, 26, 28 may have different opening angles, depending on the exact features and the geometry of the vehicle, e.g., of the vehicle dashboard.

In the Figures and the description, the arrangement is described as being arranged in the dashboard of a vehicle and reproducing sound to be perceived primarily by the driver and another passenger seated in the front seat next to the driver, not by passengers seated on the back seats. This, however, is only an example. In the same way, the loudspeaker arrangement may be arranged at any other suitable position in the vehicle in order to reproduce sound to be perceived by other passengers such as passengers seated in the back seats (e.g., second or third row) of a vehicle. According to one example, the center loudspeaker configuration as described above is arranged in a center console of a vehicle, and is configured to reproduce sound to be perceived primarily by the passengers seated on the back seats of the vehicle. That is, the mid-range loudspeaker 20 may be a non-directional loudspeaker that radiates sound towards a first rear seat and a second rear seat in equal parts, the first tweeter 22 may be a directional loudspeaker that radiates sound primarily towards the first rear seat, and the second tweeter 24 may be a directional loudspeaker that radiates sound primarily towards the second rear seat. Additional tweeters, corresponding to the third and fourth tweeters as described above, may be arranged either in the back of the passenger seat 104 or the driver's seat 102, or in the B-pillar of the vehicle, wherein each of the additional tweeters is arranged on a different side of the center loudspeaker arrangement. In this way, one, two, or even more of the disclosed loudspeaker arrangements may be arranged in a vehicle.

While various embodiments of the invention have been described, it will be apparent to those of ordinary skill in the art that many more embodiments and implementations are possible within the scope of the invention. In particular, the skilled person will recognize the interchangeability of various features from different embodiments. Although these techniques and systems have been disclosed in the context of certain embodiments and examples, it will be understood that these techniques and systems may be extended beyond the specifically disclosed embodiments to other embodiments and/or uses and obvious modifications thereof. Accordingly, the invention is not to be restricted except in light of the attached claims and their equivalents.

The description of embodiments has been presented for purposes of illustration and description. Suitable modifications and variations to the embodiments may be performed in light of the above description or may be acquired from practicing the methods. The described arrangements are exemplary in nature, and may include additional elements and/or omit elements. As used in this application, an element recited in the singular and proceeded with the word "a" or "an" should be understood as not excluding plural of said elements, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The described systems are exemplary in nature, and may include additional elements and/or omit elements. The subject matter of the present disclosure includes all novel and non-obvious combinations and sub-combinations of the various systems and configurations, and other features, functions, and/or properties disclosed. The following claims particularly point out subject matter from the above disclosure that is regarded as novel and non-obvious.

The invention claimed is:

1. A loudspeaker arrangement comprising:

a mid-range loudspeaker arranged in a dashboard of a vehicle;

a first tweeter arranged adjacent to the mid-range loudspeaker in the dashboard of the vehicle; and a second tweeter arranged adjacent to the mid-range loudspeaker in the dashboard of the vehicle, wherein the mid-range loudspeaker is arranged between the first tweeter and the second tweeter, the mid-range loudspeaker is a non-directional loudspeaker that radiates sound towards a driver's seat and towards a passenger seat in equal parts, the first tweeter is a directional loudspeaker that radiates sound primarily towards the passenger seat, and the second tweeter is a directional loudspeaker that radiates sound primarily towards the driver's seat, wherein the first tweeter and the second tweeter are each arranged at a distance of no more than 10 cm a third tweeter and a fourth tweeter, wherein the third tweeter is arranged distant to the mid-range loudspeaker on a first side of the mid-range loudspeaker, the fourth tweeter is arranged distant to the mid-range loudspeaker on a second side of the mid-range loudspeaker that is opposite to the first side, the third tweeter is a directional loudspeaker that radiates sound primarily towards the passenger seat, and the fourth tweeter is a directional loudspeaker that radiates sound primarily towards the driver's seat, and wherein:

the first tweeter is arranged closer to the passenger seat than to the driver's seat, and the second tweeter is arranged closer to the driver's seat than to the passenger seat, such that a main radiation lobe of the first tweeter and a main radiation lobe of the second tweeter do not intersect.

2. The loudspeaker arrangement of claim 1, wherein the mid-range loudspeaker has a circular cross-section, and wherein the first tweeter and the second tweeter each have a rectangular cross-section.

3. The loudspeaker arrangement of claim 1, wherein the third tweeter is arranged at a distance of at least 50 cm from the mid-range loudspeaker, and the fourth tweeter is arranged at a distance of at least 50 cm from the mid-range loudspeaker.

4. The loudspeaker arrangement of claim 3, wherein the third tweeter and the fourth tweeter each are either mounted to or in the dashboard of the vehicle or coupled to an A-pillar of the vehicle.

5. A loudspeaker arrangement comprising:

a mid-range loudspeaker arranged in a center console of a vehicle;

a first tweeter arranged adjacent to the mid-range loudspeaker in the center console of the vehicle; and a second tweeter arranged adjacent to the mid-range loudspeaker in the center console of the vehicle, wherein the mid-range loudspeaker is arranged between the first tweeter and the second tweeter, the mid-range loudspeaker is a non-directional loudspeaker that radiates sound towards a first rear seat and a second rear seat in equal parts, the first tweeter is a directional loudspeaker that radiates sound primarily towards the first rear seat, and the second tweeter is a directional loudspeaker that radiates sound primarily towards the second rear seat, wherein the first tweeter and the second tweeter are each arranged at a distance of no more than 10 cm from the mid-range loudspeaker, and a third tweeter and a fourth tweeter, wherein the third tweeter is arranged distant to the mid-range loudspeaker on a first side of the mid-range loudspeaker, the fourth tweeter is arranged distant to the mid-range loudspeaker on a second side of the mid-range loudspeaker that is opposite to the first side, the third tweeter is a directional loudspeaker that radiates sound primarily towards the first rear seat, and the fourth tweeter is a directional loudspeaker that radiates sound primarily towards the second rear seat, and wherein:

the first tweeter is arranged closer to a front passenger seat than to a driver's seat, and the second tweeter is arranged closer to the driver's seat than to the front passenger seat, such that a main radiation lobe of the first tweeter and a main radiation lobe of the second tweeter do not intersect.

6. The loudspeaker arrangement of claim 5, wherein the third tweeter and the fourth tweeter each are either mounted to or in a back of the driver's seat or the front passenger seat, or coupled to a B-pillar of the vehicle.

7. A loudspeaker arrangement comprising:

a mid-range loudspeaker arranged in a dashboard of a vehicle;

a first tweeter arranged adjacent to the mid-range loudspeaker in the dashboard of the vehicle; and a second tweeter arranged adjacent to the mid-range loudspeaker in the dashboard and positioned opposite to the first tweeter in the dashboard, wherein the mid-range loudspeaker is a non-directional loudspeaker that radiates sound towards a driver's seat and towards a passenger seat in equal parts, the first tweeter is a directional loudspeaker that radiates sound primarily towards the passenger seat, and the second tweeter is a directional loudspeaker that radiates sound primarily towards the driver's seat, wherein the first tweeter and the second tweeter are each arranged at a distance of no more than 10 cm from the mid-range loudspeaker, a third tweeter and a fourth tweeter, wherein the third tweeter is arranged distant to the mid-range loudspeaker on a first side of the mid-range loudspeaker, the fourth tweeter is arranged distant to the mid-range loudspeaker on a second side of the mid-range loudspeaker that is opposite to the first side, the third tweeter is a directional loudspeaker that radiates sound primarily towards the passenger seat, and the fourth tweeter is a directional loudspeaker that radiates sound primarily towards the driver's seat, and wherein:

the first tweeter is arranged closer to the passenger seat than to the driver's seat, and the second tweeter is arranged closer to the driver's seat than to the passenger seat, such that a main radiation lobe of the first tweeter and a main radiation lobe of the second tweeter do not intersect.

8. The loudspeaker arrangement of claim 7, wherein the loudspeaker arrangement is arranged centrally in the dashboard of the vehicle, such that a distance from the mid-range loudspeaker to the driver's seat equals a distance from the mid-range loudspeaker to the passenger seat.

9. The loudspeaker arrangement of claim 7, wherein the mid-range loudspeaker has a circular cross-section, and wherein the first tweeter and the second tweeter each have a rectangular cross-section.

10. The loudspeaker arrangement of claim 7, wherein the third tweeter is arranged at a distance of at least 50 cm from the mid-range loudspeaker, and the fourth tweeter is arranged at a distance of at least 50 cm from the mid-range loudspeaker.

* * * * *